(12) United States Patent
Hamlin et al.

(10) Patent No.: US 9,401,991 B2
(45) Date of Patent: *Jul. 26, 2016

(54) SYSTEM AND METHOD TO DIAGNOSE AND IMPROVE REPRESENTATIVE AND ORGANIZATIONAL PERFORMANCE

(71) Applicant: Florida Power & Light Company, Juno Beach, FL (US)

(72) Inventors: Maureen Hamlin, Wellington, FL (US); Francisco Perez, Greenacres, FL (US); Philip Bramble, Royal Palm Beach, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,134

(22) Filed: Aug. 17, 2015

(65) Prior Publication Data

US 2016/0006872 A1 Jan. 7, 2016

Related U.S. Application Data

(63) Continuation-in-part of application No. 14/145,105, filed on Dec. 31, 2013, now Pat. No. 9,112,973.

(60) Provisional application No. 61/747,604, filed on Dec. 31, 2012.

(51) Int. Cl.
*H04M 3/00* (2006.01)
*H04M 5/00* (2006.01)
*H04M 3/51* (2006.01)
*G06Q 10/06* (2012.01)

(52) U.S. Cl.
CPC ....... *H04M 3/5175* (2013.01); *G06Q 10/06395* (2013.01); *H04M 2203/401* (2013.01)

(58) Field of Classification Search
CPC ................. H04M 2203/401; H04M 2203/402; H04M 2203/403; H04M 3/5175
USPC ............. 379/265.06, 265.03, 265.05, 265.11, 379/265.13, 242; 705/9; 709/224
See application file for complete search history.

(56) References Cited

U.S. PATENT DOCUMENTS

| | | |
|---|---|---|
| 6,148,335 A | 11/2000 | Haggard et al. |
| 2003/0009373 A1 | 1/2003 | Ensing et al. |
| 2003/0214534 A1* | 11/2003 | Uemura ............... G06Q 10/109 715/805 |
| 2008/0147470 A1 | 6/2008 | Johri et al. |

* cited by examiner

*Primary Examiner* — Thjuan K Addy
(74) *Attorney, Agent, or Firm* — Feldman Gale, P.A.

(57) ABSTRACT

A computer-readable storage medium containing a data server application, which when executed on a processor is configured to perform an operation providing a view of performance data based on multiple performance rating criteria for evaluating multiple customer service agents across an enterprise. The operation may include receiving data corresponding to call handling for a first agent from the multiple agents and processing the received data to generate performance data for the first agent based on process steps followed by the first agent for handling a call type. The operation also includes assigning a color scheme to the process steps depending on the importance of the steps to an enterprise and transmitting a signal to display agent performance data based on the color scheme and indicative of steps missed by the first agent.

20 Claims, 11 Drawing Sheets

| Critical | Severe | Caution | Met |
|---|---|---|---|
| 101 | 103 | 105 | 107 |
| Critical | Severe | Caution | Green |
| Red– Identifies quality requirements that are Critical to the success of a process | Purple– Identifies system enablers– reps receive "screen pops," information is pushed to them | Yellow– Identifies systems where agents need to locate information in other applications or scroll down to make a selection | |
| 5 criteria identified: | ~ System guides Agents through call screening questions ~ There is no need to search for customer information | ~ Agents need a certain level of process knowledge to navigate intelligently through the system | |
| | Just Read or follow the Screen | Where do I go now? | All call criteria met |
| 1. Can present a safety issue to employees or customers 2. A financial risk to FPL or customers (i.e., Sarbanes Oxley, confidentiality) 3. Action severely affects customer experience (rudeness, inappropriate behaviors) 4. Effects cost of call 5. Impacts single contact resolution | | | |

Critical | Sys Gen | Script | Met Req

FIG.1

This visual helped inspire the "traffic light" concept

| Process Connect/Amend | Missed Steps | | YTD |
|---|---|---|---|
| 205 — | Accessibility/P | | 61 |
| 207 — | MLS/breakers OFF/P | | 21 |
| 209 — | MLS/breakers/P | | 18 |
| 211 — | CM timeframe/P | | 8 |
| 213 — | CCAD/Y | | 5 |
| 215 — | Amend/cancel order/R | | 5 |
| 217 — | Effective date req/R | | 3 |
| 219 — | Accurate info/Y | | 3 |
| | (blank) | | 2 |
| 221 — | Breakers/P | | 1 |
| 223 — | Contact info/Y | | 1 |
| 225 — | Sufficient info/Y | | 1 |

227 — Process Requirements in all Categories

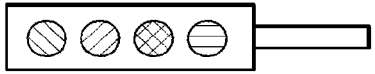

| Process Credit Card | Missed Steps | | YTD |
|---|---|---|---|
| 233 — | Previous CC/Y | | 287 |
| 235 — | Card billing address/Y | | 267 |
| 237 — | RITS update/Y | | 217 |
| 239 — | Zip code/Y | | 179 |
| 241 — | Cards accepted/Y | | 146 |
| 243 — | Vendor ph number/Y | | 98 |
| 245 — | Account number/Y | | 94 |
| 247 — | Service charge/Y | | 68 |
| 249 — | Transfer customer/Y | | 54 |
| 251 — | Accurate info/Y | | 16 |
| 253 — | Timeframe/Y | | 11 |
| 255 — | CCAD Incorrect/Y | | 10 |
| 257 — | Troubleshoot process/Y | | 10 |
| 259 — | Eligibility/Y | | 9 |

261 — Zero System Generated or Critical Questions

FIG. 2

| Contact ID | Rep | EMO | Status | Report Usage | Evaluation Date/Time | Observer | Supv | Lang | Cult Code | Proc | PFP | |
|---|---|---|---|---|---|---|---|---|---|---|---|---|
| 9112769660422001012 | Perez, Liliam | JAN | Released | Include in PFP Reports | 1/20/2012 9:41:43 AM | Patrick Doe | Cristina Doe | Engl | 3.0 | 0.0 | 3.0 | View |
| 91127696960072001012 | Perez, Liliam | JAN | Released | Include in PFP Reports | 1/19/2012 11:02:01 AM | Patrick Doe | Cristina Doe | Engl | 3.0 | 1.0 | 4.0 | View |
| 9112770322852001012 | Perez, Liliam | JAN | Released | Include in PFP Reports | 1/18/2012 10:30:23 AM | Patrick Doe | Cristina Doe | Engl | 2.4 | 2.0 | 4.4 | View |
| 9112716443482001012 | Perez, Liliam | JAN | Released | Include in PFP Reports | 1/12/2012 10:07:02 AM | Patrick Doe | Cristina Doe | Engl | 3.0 | 2.0 | 5.0 | View |

FIG. 4

| STATUS | PROCESS | MISSED PROCESS STEPS | JAN | FEB | MAR | APR | MAY | JUN | JUL | AUG | SEP | OCT | NOV | DEC | Grand Total |
|---|---|---|---|---|---|---|---|---|---|---|---|---|---|---|---|
| Critical | Disconnect | Effective Date req/R | | | | | 1 | | 2 | | 2 | | | | 8 |
| | | Unnecessary transfer/R | | | 1 | | | | | | | | | | 1 |
| | | Verify mail address/R | 1 | 1 | 1 | 1 | 2 | 1 | 2 | 1 | 4 | | | | 13 |
| Critical Total | | | 1 | 1 | 1 | 1 | 2 | 4 | 1 | 6 | | | | | 22 |
| Severe | Disconnect | Current balance/P | 1 | 2 | 1 | 2 | 1 | | 1 | 1 | | | | | 8 |
| | | Deposit advise/P | 1 | 2 | 3 | 3 | 2 | 2 | 2 | 2 | 2 | | | | 18 |
| | | FBIL dates/P | | 3 | 4 | 4 | 4 | 2 | 2 | 2 | 1 | | | | 22 |
| | | MLS/breakers OFF/P | 9 | 17 | 11 | 9 | 6 | 4 | 9 | 10 | 7 | | | | 82 |
| | | Ord valid cust name/P | 5 | 10 | 6 | 4 | 8 | 4 | 10 | 5 | 4 | | | | 56 |
| | | Ord valid eff date/P | 2 | 3 | 1 | 1 | 3 | 2 | 2 | | 1 | | | | 15 |
| | | Ord valid mail addr/P | 2 | 2 | 4 | 5 | 3 | 1 | 4 | 2 | 3 | | | | 26 |
| | | Ord valid svc addr/P | 4 | 4 | 3 | 3 | 1 | | 2 | | 2 | | | | 18 |
| | | Phone number/P | | 2 | 3 | 1 | 1 | 1 | | 1 | 2 | | | | 11 |
| | | Req SSN/TIN/SIN/P | | 1 | 2 | 1 | 1 | 2 | 2 | | 1 | | | | 8 |
| Severe Total | | | 23 | 42 | 37 | 32 | 32 | 18 | 33 | 23 | 24 | | | | 264 |
| Caution | Disconnect | Accurate info/Y | 2 | 2 | 2 | 2 | 2 | 1 | 2 | 2 | | | | | 14 |
| | | Appropriate info/Y | 1 | 1 | | 1 | | 1 | | 1 | 1 | | | | 6 |
| | | Business Greeting/Y | 3 | | | | | 1 | | 1 | | | | | 5 |
| | | Commerical contact/Y | 2 | 1 | | 1 | 2 | | 1 | | | | | | 7 |
| | | Sufficient info/Y | 4 | 2 | 3 | 3 | 3 | 2 | 1 | 1 | 1 | | | | 17 |
| Caution Total | | | 12 | 3 | 5 | 3 | 7 | 5 | 5 | 5 | 2 | | | | 49 |

FIG.5

User Evaluating the call: The Process Tab visually identifies when a process is new

QVAL 2012-[Form_mainform:Form]

VERINT | IMPACT360     Preferences | Help

Welcome Doe, Maureen     [Additional Applications] [Toolbox]

Quality Monitoring
- Ibox
- Evaluate
- Evaluations
- Flagged Evaluations
- My Searches
- Search
- Supervisor Dashboard Customer Xperience
- Exception Contacts
- Assess
- Assessments
- Flagged Contacts
- My Searches
- Search Reports
- Reports Contacts Evaluation Activity per Evaluator Please wait while Impact 360 prepares this report. This process may take several minutes, Click Refresh (F5) to display the report.

These Buttons DO NOT Save Current Evaluation: [Exit] [Read Only List] [Edit List]
These Buttons DO Save Current Evaluation: [Released] [Unreleased] [Incomplete]

New 2012 QA Evaluation

| Contact Data | Culture | Code | Process | Summary |

Average Process PFP: 0.00

Process 1 | Process 2 | Process 3 | Process 4 | Process 5 | Process 6 | Process 7 | PNA1 | PNA2 | PNA3

Unnecessary Transfer ☐    Process 1 Level:    Process 1 PFP: ☐

Select Process 1 | Customer Experiece    Notes:

[Process Sheet] Rev   Select Missed Steps     Coaching

New requirements
↓ 605

| Color | Customer Experience Question — 603 | Coaching | Within 31 Days Revised | Rev Dt | Rmvd |
|---|---|---|---|---|---|
| C | Customer Mood – Complimentary/C | Individualize | Y | 7/1/2012 | |
| C | Customer Mood – Frustrated/C | Individualize | Y | 7/1/2012 | |
| C | Customer Mood – Rude/C | Individualize | Y | 7/1/2012 | |
| C | Customer Mood – Understanding/C | Individualize | Y | 7/1/2012 | |
| C | Repeat Call Due to Customer/C | Individualize | Y | 7/1/2012 | |
| C | Repeat Call Due to Customer/C | Individualize | Y | 7/1/2012 | |
| C | Repeat Call Due to Process/C | Put Process– "process causing issues" in Notes | Y | 7/1/2012 | |
| C | Repeat Cal Due to Rep/C | Individualize | Y | 7/1/2012 | |
| C | Repeat Call Due to System/C | Individualize | Y | 7/1/2012 | |
| C | Social Media – Apps/C | Individualize | Y | 7/1/2012 | |
| C | Social Media – Facebook/C | Individualize | Y | 7/1/2012 | |
| C | Social Media – FLP.com/C | Individualize | Y | 7/1/2012 | |
| C | Social Media – Live Chat/C | Individualize | Y | 7/1/2012 | |
| C | Social Media – Twitter/C | Individualize | Y | 7/1/2012 | |

Cont. From FIG.6-1

The system identifies that a process requirements has changed... and allows the user to bring up a process requirement sheet to view the latest/or all requirements.

FIG. 6-B

Figure 7:
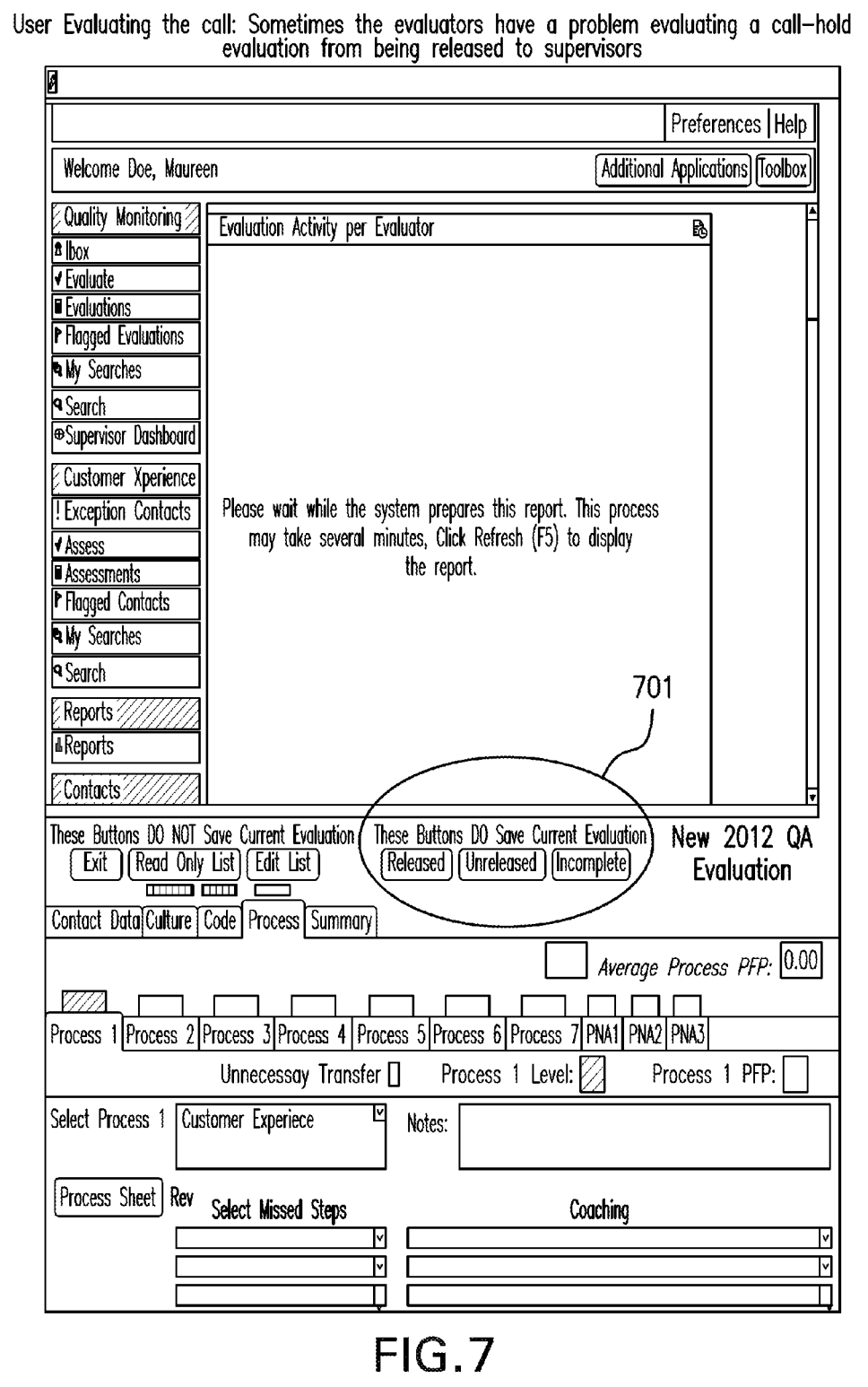

User Evaluating the call: Sometimes the evaluators have a problem evaluating a call-hold evaluation from being released to supervisors

| Data | Culture | Code | Process | Summary |

↑
901

*Attitude of Service*     Wow ☐    A-Excellent ☐    B-Good ☐    C-Caution ☒    D- Poor ☐    F-Fail ☐    *Overall Culture Pts:* 2
*Attitude of Service Pts:* 2

Introduction Level     Notes:
(I) Professional Greeting         ☐ Front line reps must use pop; if no pop greet w/name and lead to business; Trfr and Seg Segment spec calls—refer to Def Doc
(A) Acknowledgement Given         ☐ Confirm/Verify/Paraphrase/Summarize customer request (at outset of call)
(A) Address Human Element         ☐ Address Human element before business if cust shares a personal situation, hardship, experience, etc; addr probable feelings

Professionalism Level     Notes:
Communication Level
(CP) May I's, Please, Thank you's     ☐ Proper Phone etiquette— ask questions with May I's and Pleases, and provide a Thank You when given info
(CP) Avoid Sounds of Silence         ☐ Manage Sounds of Silence, help cust understand reason for delay when cust is on a soft hold, keep conversation flowing
(CP) Professional Speech             ☐ Reflect professionalism in pace, volume and clarity; avoid slang or jargon, etc; be articulate and avoid mumbling
(CP) Customer Name                   ☐ Use customer name to personalize the call
(PH) Proper Hold Skills              ☐ It's important to adv cst why you're placing them on hold AND to gain the cst's acceptance before you place them on hold
(PH) Thank Customer for holding      ☐ Thank cust for holding upon returning to call
(CE) Probing Questions               ☐ Listen and assess cust inquiry; ask questions when cust's request is broad or we don't understand what they want
(CE) Call Control                    ☐ Maintain call control; route cust back to FPL business while balancing cust rapport w/efficiency; acct retrieval
(L) Listens without interruption     ☐ Caller must be allowed to finish their sentences, even if we believe we may already know how to respond
(L) Focus on what is being said      ☐ Focus, jot down, Note–whatever cust says as they say it to prevent our cust from having to repeat themselves
(CC) Address Human Element           ☒ Promptly address human element if cust shares a personal concern, situation, hardship, experience; addr probable feelings
(CC) Inappropriate Statement         ☐ Avoid statements that berate or sound condescending to our caller (example: "As I said before" or "As I explained earlier...")
(CC) Unnecessary Remarks             ☐ Avoid bringing up negative info about our cust they may perceive offensive, such as late payment history, when it is unnecessary to do so

Tone Level
A-B Friendly                         ☐ Friendly tone, good inflection, caring
C Impersonal                         ☒ Scripted, lacking sounds of confidence, lacking inflection, not an A/B Tone
D Defensive Tone/Uncaring            ☐ Curt, condescending, impatient, frustrated, unfriendly, sarcastic, uncaring, tactless, improper way to convey unwelcome info
F Unacceptable Tone                  ☐ Combative, confrontational, impolite, offensive, vulgar, disrespectful, accusatory

Closing Level     Notes:

SYSTEM AND METHOD TO DIAGNOSE AND IMPROVE REPRESENTATIVE AND ORGANIZATIONAL PERFORMANCE

CROSS REFERENCE TO RELATED APPLICATIONS

This application is a continuation in part of U.S. application Ser. No. 14/145,105 filed Dec. 31, 2013, which claims the benefit of U.S. Provisional Application No. 61/747,604, filed Dec. 31, 2012, the entire contents of which are herein incorporated by reference.

FIELD OF THE DISCLOSURE

The invention relates generally to call centers or other call processing systems in which voice calls, e-mails, faxes, voice messages, text messages, Internet service requests and other types of communications are distributed among a number of service agents for handling. More particularly, the invention relates to a two-part customer service representative or agent quality evaluation approach that uses a traffic light approach to evaluate steps in process execution as well as an integrated system that tracks and reports representative performance on each call.

BACKGROUND

Call centers provide a wide array of services for customers of the companies that use them. Through a call center, a company can service customers around the world, around the clock. The essence of call center effectiveness and efficiency, however, is the performance of the call center service representatives or agents that serve the calling customers. Call center supervisors manage call service representatives and are responsible for monitoring their performance. Call center supervisors may monitor service representatives' calls for various reasons, including: to provide training to the customer service representatives, to assure the quality of customer service, and to maintain security within the company.

For a call center that uses an automatic call distributor (ACD), private branch exchange (PBX), or other suitable routing device, there typically exist features that are integral to the ACD that enable monitoring of service representative performance. These capabilities, however, are generally manual and have significant limitations. With other demands on their time and attention, supervisors may not be consistent or equitable in the ways that they monitor each agent. These inconsistencies and inequities may result in a supervisor monitoring an agent either for too little time or too much time, or too infrequently or too frequently. This may cause an imbalance in the supervisor's perception of an agent relative to other agents in the call center.

Another problem that manual scheduling and monitoring of agents causes is increased time pressure on the supervisors themselves. For example, they must remember who has been monitored, for how long they have monitored or intend to monitor an agent, and when to monitor the agent. If a call center has numerous service representatives, the requirement to monitor the performance of these agents may seriously and adversely affect the productivity of the call center supervisor. This is because the task of monitoring agents is only one of many tasks that the supervisor must perform.

Prior systems rely on a simple percentage-based system for evaluating performance of a representative or agent. For example, a representative may be assigned a score of 96% based on a set of criteria met by the agent with a target score of 95%. Now, in prior art systems used for the evaluation of representatives, if a representative scored 94%, the prior art system would not be able to identify significant differences between a 96% score (pass) and a 94% score (fail) other than identifying which representative met the target score. Thus, there is a need in the art for a system that analyzes differences in performance ratings among customer service representatives or agents.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment, the present disclosure describes a system and method for providing a view of performance data based on a number of performance rating criteria for evaluating a plurality of customer service agents across an enterprise. The method includes receiving data corresponding to call handling for an agent; processing data to generate performance data for said first agent based on process steps followed by the agent for handling a call type; assigning a color scheme to process steps depending on the importance of the steps to an enterprise; and transmitting a signal to display agent performance data based on the color scheme and indicative of steps missed by the agent.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 1 illustrates a chart illustrating a traffic light approach in a rating scale for evaluating process compliance in accordance with one embodiment;

FIG. 2 illustrates two exemplary processes that representatives are expected to accurately execute in accordance with one embodiment;

FIG. 4 illustrates a report illustrated that may be used to assist supervisors in ascertaining whether calls handles by a representative were good or bad calls based on the color coding in accordance with one embodiment;

FIG. 5 illustrates a matrix that outlines a process with each step required under a Company's policies in accordance with one embodiment;

FIGS. 6-A and 6-B illustrate a user interface used to evaluate a call in accordance with one embodiment;

FIG. 7 illustrates another view of the user interface for users to evaluate a call in accordance with one embodiment;

FIG. 8 illustrates an exemplary report that a user can use to sort evaluations, identify the number of evaluations completed, and identify the need for coaching based on the traffic light approach described in the present disclosure;

FIG. 9 illustrates a user interface that guides the user to the evaluation score for a particular tab, identifies the defects for coaching, and provides a performance score used PFP reports, in accordance with one embodiment; and FIG. 10 illustrates a user interface that may be used to track evaluation status and to enable a user to monitor, audit, modify, challenge, or otherwise to dispute an evaluation or its status.

DETAILED DESCRIPTION

Figure 3:
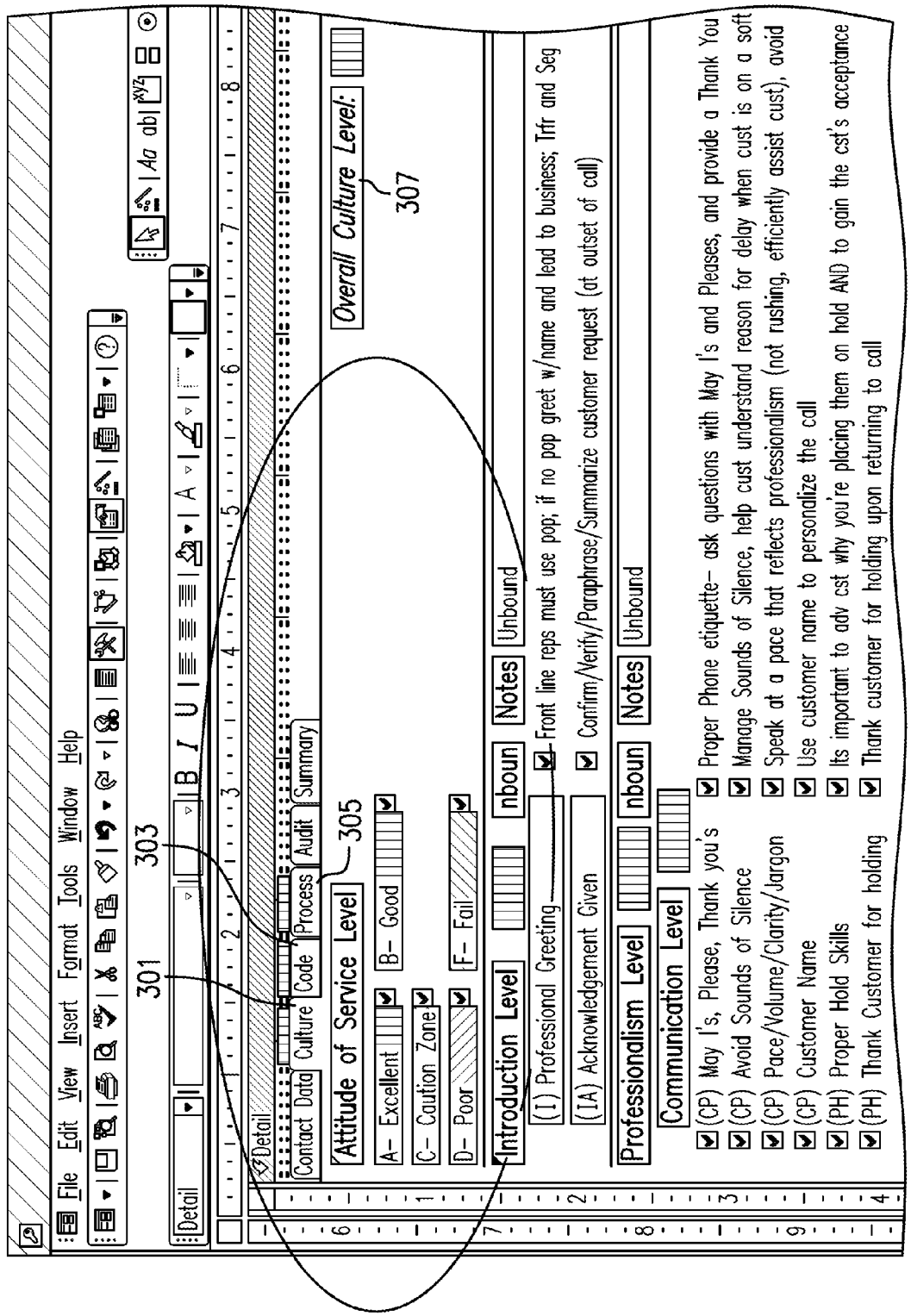
FIG. 3 illustrates an exemplary Quality Evaluation form in accordance with one embodiment.

As used herein, an element or step recited in the singular and proceeded with the word "a" or "an" should be understood as not excluding plural of said elements or steps, unless such exclusion is explicitly stated. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense.

The present invention may be used by an enterprise to evaluate call handling by agents or representatives. In accordance with one embodiment, the present invention provides a form-based system that assists the supervisors, employees, trainers and quality teams to both evaluate a call and identify the type of coaching needed and urgency of that coaching. Process Coordinators may also use the data to develop future systems for the agents or customer service representatives.

In one embodiment, a database may be used to identify the type of requirements that are being missed, provide coaching statements, display if feedback on evaluation is more immediate than others (via coaching) and correlate data with Customer Care Center performance metrics.

The present disclosure describes the implementation of a two-part Quality Evaluation approach which may include using both a traffic light methodology that corresponds to steps in process execution as well as an integrated system that tracks and reports representative performance on each call. This approach may be implemented through use of software modules that enable a system user (customer service supervisor, management, etc.) to determine how well customer service representatives handle each call that is evaluated, and diagnose the type of errors identified (based on the color/type) using the structure of an enterprise's quality and process requirements. In that regard, the approach may be supported or facilitated by acquisition and maintenance of "performance data," which in this context, are data related to or representative of how well a particular customer service representative handled a particular call; performance data may be used to identify and to track successes and failures on the part of the customer service representative based upon satisfaction of predetermined or other criteria associated with a particular call type (or "performance rating criteria" as set forth below). Additionally, this approach supports an effective Quality Management program that helps to drive organizational improvement through analysis of process and performance data.

The system of the present disclosure may include a multi-functional, inter-relational database that may capture the process and performance data per evaluated call, and may also provide customized, comprehensive reports for departments within an enterprise. Examples of reports include those for supervisors to aid in coaching individual employees, as well as reports for department leaders to monitor performance across multiple supervisors and operational centers. The system of the present disclosure may create additional analytical reports to monitor process control and execution, and to identify areas for improved operational effectiveness.

In one embodiment, the system of the present disclosure utilizes a Traffic Light methodology for evaluating steps in process execution by customer service representatives. In the traffic light approach, selected colors may be used to define the requirement severity of each process step. The selected colors may also identify whether the information that is required for a representative to execute a call is available through system prompts, or is accessible through another tool or resource.

In an embodiment, each process step is assigned one of the following colors, or requirements below (see FIG. 1):

Red 101—reflects "Critical Requirements." An example of Critical Requirements may include a step in a process, where if not followed, could put an employee, the customer or the company at risk. For example, since safety is a concern to both customers and employees, one embodiment may require a step in a "Connect Service" process where customers are asked if they have a dog on the premise and if so to secure it. Next, the customer's account may be notated so a utility employee in the field is aware of a dog present in a premise so the employee can take safety precautions when approaching the premise. A representative's failure to perform this step would result in a Critical Requirement step not followed.

Purple 103—reflects "System Generated Prompts" or "Severe Requirements." An example of a Severe Requirement may include actions that an employee is required to take, such as relaying important customer-specific information that appears as a "screen pop" on the representative's desktop. For example, when completing a request to report an Outage, the system used may generate a series of pop notifiers that the representative must communicate to the customer in accordance with the company's policies. The representative cannot make an error if they relay the information on the screen pop to the customer. If a representative chooses not to relay this information to the customer, he will receive a deduction for not performing this requirement. The type of error is a Behavioral Type Defect as opposed to a Knowledge Type Defect.

Yellow 105—reflects "Caution" or "Coaching Requirements" (e.g., the representative has to obtain additional information to provide to the customer). An example of a Caution Requirement is when a representative is on a call with a customer, and the representative needs to retrieve information from another system to assist the customer. Thus, the employee is expected to know how to navigate intelligently through the various systems available to him or her. If the employee does not know where or how to retrieve the information necessary to complete the customer's inquiry, the employee's record or profile would be marked with a Knowledge Type Defect.

Green 107—reflects "No Errors"—(used when representative does not have a defect in any of the process steps identified)

The table in FIG. 1 provides additional details of the use of color coding in a rating scale for evaluating process compliance. In that regard, it is noted that each process step, and its associated criticality level, along with rules, requirements, standards, benchmarks, measures, or other indicia that are necessary for successful completion of the step, may generally be referred to herein as "performance rating criteria." A performance rating criterion may be specific to a call type (e.g., obtain a credit card number if the call type requires a financial transaction), or may be call type independent (e.g., exhibit courtesy and decorum irrespective of call type). In some embodiments, performance rating criteria represent the standards against which performance data may be measured for a particular customer representative handling a particular call.

While the table in FIG. 1 is not displayed to users in accordance with one embodiment, it can be used to illustrate how the traffic light scoring methodology works. The illustrated table is a legend that is then applied to specific process requirements.

Each step in the process may be assigned a designated color, depending on its criticality to the process. The process step criticality and corresponding colors may be determined by the Process Coordinator responsible for his/her assigned segment call types with the assistance of the Quality, Training and Operations teams. Colors are not necessarily assigned based on past experience, etc. In one embodiment, there are three identifiers that determine what color is assigned to each process step. As processes are created or revised, so too are process requirements to ensure steps are accurately captured in an appropriate rating scale.

One aspect of the present invention relates to the type of agent coaching that may be implemented (e.g., Behavioral vs. Knowledge Based Coaching) which may be based on the traffic light concept. For example, for a Disconnect Call Process, the following guidelines for coaching may be implemented:

Critical Defects (RED)—both Behavioral and Knowledge Based Coaching;
Severe Defects (PURPLE)—all Behavioral Style Coaching;
Caution Defects (YELLOW)—all Knowledge Based Coaching.

FIG. 2 illustrates two exemplary processes that representatives are expected to accurately execute in accordance with one embodiment. The Traffic Light methodology is applied to specific processes and their steps required under the company's policies.

In the Process #1 (Connect/Amend 201) illustrated in FIG. 2, the figure shows a variety of process steps and their associated requirements. A "Connect/Amend" call type is one in which a customer has already called the utility to place an order to move into a premise, and for some reason, wants to change the move-in date. That is, a "Connect/Amend" request may be defined as a request where the customer wishes to amend his or her previous order. The representative handling the connect/amend call type has three steps (in red) that are "Critical" to the success of the call, six steps (in purple) that require the use of information provided to the representative through use of system prompts, and four steps (in yellow) where the representative has to obtain additional information to share with the customer (for example, when the rep has to go and look for additional data in another database to finalize the call, this increases the chances that a rep would make an error). The three steps identified in red signify that it is critical to the success of this call type that these requirements are met by the employee performing the transaction. For example, on the Amend/Cancel order/R step 215, if the customer requests that the utility cancel his order, but the representative fails to cancel the order, then the connect will take place and the customer will begin accumulating charges for electrical usage captured on his meter (for that reason, this would be an example of a Critical Requirement). Some processes have one or more critical requirements, depending on the steps and the purpose within the process. In accordance with one embodiment, agents do not see the colors when they handle a call.

The following list includes descriptions for the illustrated fields in FIG. 2 in accordance with one embodiment:

Process—Connect/Amend 201 may be defined as the name of the process that is being evaluated.

Accessibility/P 205 may be defined as a required step of the Connect/Amend Process (specific call type) being evaluated. Accessibility may deal with questions related to a utility's access to a customer's home (e.g., is there a gate, etc.). The "/P" notation may refer to the severity of the step ("Purple" or "Severe" in connection with the illustrated Accessibility step 205). In accordance with one embodiment, all steps missed along with the associated severity to the success of the call are identified on a Quality Evaluation Form to:

1. Determine type of coaching employee should receive (knowledge vs. behavior)
2. Assist supervisors to prioritize their coaching, based on severity of step missed
3. Assist process coordinators/trainers identify process requirements that may be misunderstood by agent.

Agents are trained to obtain or explain all requirements of a call. As a result, agents are not aware of any color association with process requirements in accordance with one embodiment.

The remaining steps may be specified by the enterprise as being steps required for a connect/amend process and may be changed as the enterprise or utility may deem fit. Any company can create their own list of requirements (steps required) to meet their needs to improve process and understand customer experience. In the illustrated embodiment, additional steps required for the connect/amend process 201 include: MLS/breakers OFF/P 207; MLS/breakers/P 209; CM timeframe/P 211; CCAD/Y 213; Amend/cancel order/R 215; Effective date req/R 217; Accurate info/Y 219; Breakers/P 221; Contact info/Y 223; and Sufficient info/Y 225. The YTD Column 227 reflects the number of missed required steps of the Connect/Amend Process. Regardless of the requirements set by the enterprise, in accordance with one embodiment each requirement is followed by a code denoting the severity of the step or requirement. For example, "/R" denotes "Red" or "Critical," and "/Y" denotes "Yellow" or "Caution."

In the illustrated connect/amend process 201, the top five requirements missed are system generated questions (denoted with a "/P"). In accordance with one embodiment, this means that the system guides agents through the call screening questions, and that agents should read or request information provided to them. Accordingly, missing these steps requires behavioral based coaching.

Process—Credit Card 267 may be defined as the name of the process that is being evaluated. For example, the Previous CC/Y 233 may be a required step of the Credit Card Process (specific call type) being evaluated. Further, CC/Y 233 may deal with questions related to a customer's previous use of a credit card process. In one embodiment, a cross functional team identifies all process step requirements and assigns appropriate color to each step (based on severity). The remaining steps may be specified by the enterprise as being steps required for a credit card process and may be changed as the enterprise or utility may deem fit. In the illustrated embodiment, additional steps required for the credit card process 267 include Card billing address/Y 235; RITS update/Y 237; Zip code/Y 239; Cards accepted/Y 241; Vendor ph number/Y 243; Account number/Y 245; Service Charge/Y 247; Transfer customer/Y 249; Accurate info/Y 251; Timeframe/Y 253; CCAD Incorrect/Y 255; Troubleshoot process/Y 257; and Eligibility/Y 259. The YTD Column 261 reflects the number of missed required steps of the Credit Card Process 267. In the credit card process 267, only one category ("Y") is illustrated. The credit card process requires agents to have a certain level of process knowledge to navigate intelligently through the system in accordance with one embodiment. Missing these process steps requires a more traditional style of coaching: knowledge vs. behavior. In the illustrated embodiment, all requirements missed are due to the agent having to know how to navigate the system. Data reflects a much higher error rate for the Credit Card Process 267 than the Connect/Amend Process 201 due to how required process steps are applied to the Traffic Light Concept.

In the Process #2 illustrated in FIG. 2 (Credit Card 231), the figure shows that none of the steps are red or "Critical" requirements, none are purple, or "Severe," indicating that none of them has system generated prompts, and all of them are yellow, which requires the representative to have the knowledge of knowing what to do or where to go to execute or process the call and provide the customer with the correct information.

Based on the color scheme applied in the two examples above, the system user (e.g., a supervisor, management, etc.) can easily diagnose which process demonstrates a higher risk of successful execution or failure. The fact that the Connect/Amend process has several steps in purple, implies that there are many system generated prompts in accordance with one embodiment. In most cases, the "Critical" steps in red may also have required scripts or system prompting as well. The combination of the red and purple process steps helps build in the accuracy of call handing (improve performance), resulting in the Connect/Amend process 201 having a greater likelihood of correct execution.

Also, the illustrated embodiment where the Credit Card process steps 231 are all yellow indicates that a representative is expected to have the knowledge (or know where to get the information) to accurately handle the call. This example leaves more to chance in effective call handling. Depending on the severity and complexity of the overall process, additional rigor may be built-in through assignment of critical requirements and system enabled prompts to help ensure the required level of accuracy in call handling. A Process Coordinator along with members of a Process Trigger Team, a cross-functional team with representation from the Quality, Training and Operations teams, may be responsible for each segment call type and its associated processes. The team may refer to the Traffic Light Graphics above to assign colors to various steps. By capturing and reporting on these categories of process execution data, a system user is able to better identify representative performance as well as process improvement opportunities.

The Table below illustrates another embodiment of the processes illustrated in FIG. 2. The upper portion of the table lists questions and includes coaching information for the Amend/Connect process while the bottom portion of the table lists questions and includes coaching information for the Credit Card process. In the table, each question is assigned a color to denote how important it is for the enterprise for the customer service representative to follow the steps listed in the chart. FIG. 2 captures the number of instances where a particular customer service representative has missed some of the steps in the customer service process.

| Process | Question | Clr | Coaching |
|---|---|---|---|
| Amend/Connect | Amend/cancel order/R | R | Amend or cancel order |
| Amend/Connect | Effective date req/R | R | Enter valid effective date requested by customer |
| Amend/Connect | Accessibility/P | P | To ensure order is not delayed, remind customer of need access to meter |
| Amend/Connect | Bill date/P | P | If in Pop Up, then advise customer next bill date |
| Amend/Connect | Breakers/P | P | Remind customer to turn on breakers when they arrive at new premise if power is not on |
| Amend/Connect | Breakers OFF/P | P | To ensure order is not delayed, remind customer to turn breakers to OFF position |
| Amend/Connect | CM timeframe/P | P | Adv timeframes: By 2 pm = Try today; Future = between 7 am & next bus day or dt reqd; Set meter = 1-3 days |
| Amend/Connect | Confirmation number/P | P | Provide confirmation number (acct number) on connects and trfrs when not prompted for VAPORS |
| Amend/Connect | Deposit advise/P | P | Advise customer if they will or will not be billed a deposit |
| Amend/Connect | One time svc charge/P | P | Explain there will be a one time service charge billed on first bill |
| Amend/Connect | Contact info/Y | Y | Complete Contact Info window w/ Representative ID if order being amended due to Representative error in entering original order |
| Credit Card | Account number/Y | Y | Make sure customer has account information before calling payment processing company |
| Credit Card | Card Billing Address/Y | Y | Advise customer must have credit card with US or Canadian billing address |
| Credit Card | Cards accepted/Y | Y | Advise which credit cards are accepted. (e.g., MC, Discover, Debit Cards with Pin Less Debit, etc.) |
| Credit Card | Previous CC/Y | Y | Ask if customer had previously paid by credit card |
| Credit Card | RITS update/Y | Y | Update acct when payment processing company's info was provided using RITS |
| Credit Card | Service charge/Y | Y | Provide customer with payment processor's service charge |
| Credit Card | Transfer customer/Y | Y | Transfer eligible customers to credit card company |
| Credit Card | Troubleshoot process/Y | Y | Advise to contact payment processor if any problem w/credit card payment by using RITS request |
| Credit Card | Vendor ph number/Y | Y | Provide vendor # if customer requests it |
| Credit Card | Zip Code/Y | Y | Advise customer must have Zip Code to pay payment processing company |

In one embodiment, the system of the present invention includes a database that supports several functions to serve groups/departments in an enterprise as follows. In that regard, it is noted that a system and method in accordance with the present disclosure may receive data corresponding to or related to call handling performance in a variety of different contexts. These data, such as may be maintained in the database noted above, may be used to generate, modify, or otherwise to process performance data for a customer service agent or representative. For instance, corporate policy or standards information related to a specific call type, the time of day a call was received or its duration, the point at which the call occurred during the representative's shift, whether a call is from a customer whose issue remained unresolved by a different representative, or a combination of these and other corresponding or related data may be collected and associated with a particular call; in some instances, it may be desirable to use these data, for example, in combination with performance rating criteria or otherwise, to generate or to facilitate generation of performance data for a particular call and a particular representative.

Quality Team—apply traffic light concept directly to questions/attributes captured in customer service representative evaluation form.

Supervisors—A Quality Team Database generates a report on representative performance that may help prioritize coaching efforts based on the types of errors identified within the entire team on specific representatives. With this report, the supervisor can determine whether an error occurs with only a specific representative or two, or if the error occurs across a majority of his representatives.

Management Team (including Operation Managers, Supervisors—who report to Operations Managers, Quality, Training and Process Coordinators)—has ability to run reports which provide trending on representative performance and process execution at a micro or macro level including data on representative performance, process compliance and comparative data from team to team, and by each center of operation. A supervisor is responsible to coach his employees on evaluations completed by the Quality Team. The Operation Managers have the ability to view the performance of the supervisors and their representatives who report directly to them.

Process Coordinators—identify the extent to which the call handling process was executed correctly and consistently for their segment specific call types, and identify the need for process improvements or system-enabled enhancements.

Training Team—analyze performance of representatives who need additional training or reinforcement in a specific area.

The exemplary Quality Evaluation form illustrated in FIG. 3 applies the Traffic Light approach to evaluate representatives overall "Attitude of Service" on their calls.

Additional reports may be created to identify the types of defects simply by looking at the color assigned to each evaluation, which allows supervisors to prioritize their coaching activities. The chart below includes the following information:

Status—indicates that the call was released (produces an automatically generated email to the supervisor advising the evaluation is complete for employee)

The evaluation form may include three or more tabs:

Cult 301—(Culture) tracks professionalism, courtesy skills, voice tone, empathy, etc.

Code 303—(Code of Conduct) tracks confidentiality, unacceptable behaviors (Internet during call)

Process 305—(Process) tracks all the processes along with their appropriate requirements An overall performance 307 of the evaluation itself may be described with a color in one embodiment.

When a supervisor views a completed evaluation, the color coding helps him quickly surmise the performance of the call and identify the types of errors that have occurred (e.g., red=severe vs green=error free). This information helps the supervisor prioritize the coaching that may be required for the representative. The supervisor also reviews the evaluation to determine the total points associated with each tab, e.g., Culture+Code+Process=Total PFP Score. As may be understood by one of ordinary skill in the art, PFP may be an acronym for "pay for performance."

The report illustrated in FIG. 4 may be used to assist supervisors in ascertaining whether any of four calls handles by a representative were good or bad calls based on the color coding. In the figure, numeral 401 identifies the Contact ID number; numeral 403 indicates a column listing the customer service representative; and numeral 405 indicates the evaluation month ("EMO"), which may be defined as the month in which the evaluation was completed which is not necessarily the month in which the call was handled.

In addition, numeral 407 identifies the Status of the evaluation. Upon completion of an evaluation, the call is saved and Released to a supervisor for review and coaching. There are times when an evaluator may have a question before the evaluation is released and seeks assistance of their supervisor or co-workers. In these instances, the evaluator may save the evaluation as UNRELEASED until such time as question(s) can be addressed. When the evaluator addresses the UNRELEASED evaluation, the evaluation will be saved and RELEASED.

Numeral 409 refers to the report usage. For example, there may be several reason why calls are evaluated:
 a. For agent performance (monetary purposes)
 b. Blitz a process to understand customer experience and/or perspective
 c. New process designed (corporate initiative)
 d. Seasonal—HBI and Storm calls during summer months, etc.

The evaluator, based on the reason for the evaluation, may select from a drop down box to indicate if the evaluation should be included in performance reports, include in blitzing reports, etc.

Other field illustrated in FIG. 4 include the evaluation date/time 411; the name of the Observer 413; the agent's supervisor 415; the culture score 419; the code of conduct 421; the process score 423; and the PFP score 425.

When reviewing reports from the Quality system, a system user can easily determine at-a-glance how many Critical, Severe, or Caution actions were missed in a variety of focus areas. This allows for faster analysis of how well the representative performed and to what extent the process was being executed as prescribed. The report illustrated in FIG. 5 indicates how many (511) Critical 501, Severe 507, or Caution 509 actions were missed in a variety of focus areas.

The matrix in FIG. 5 outlines one process 503 with each step required under the Company's policies. The Missed Process Steps are broken down using the traffic light concept. The Data captured from January through October signifies the number of times a specific process requirement was missed.

The reported level of performance achieved may be used by an enterprise to drive coaching of customer service representatives. For example, there could be a distinct difference in why an agent missed a knowledge step versus a system generated one, which is a difference that managers could account for when determining the type or style of coaching to implement. For example, enterprises may implement behavioral or knowledge-based coaching. Coaching may be provided to agents or representatives in all areas of their evaluation form.

Referring to FIG. 5, all information captured can be applied at the enterprise level. A company's Care Center may support other business units by assisting with the design of their evaluation form to capture the customer experience along with Process and Culture attributes.

Referring to FIG. 5, numeral 501 identifies a Critical/RED (Traffic Light Concept) category of defects in connection with missed process steps Effective date request, Unnecessary transfer, and Verify mail address. Numeral 503 identifies the Process Evaluated, which in the illustrated embodiment is a Disconnect Process.

Numeral 505 identifies Missed Process Steps. In the illustrated embodiment, three different Critical (RED) process steps are missed.

Numeral 507 identifies the Sever category of defects in connection with missed process steps Current balance; Deposit advise; FBIL dates; MLS/breakers OFF; Ord valid cust name; Ord valid eff date; Ord valid Mail addr; Ord valid svc address; Phone number; and Req SSN/TIN/SIN. Numeral 509 identifies the Caution category of defects in connection with missed process steps Accurate info; Appropriate info; Business Greeting; Commercial contact; and Sufficient info. Numeral 511 identifies a Year to date trending report; it provides number of defects made for the Disconnect Process by category.

Behavioral coaching may be provided to employees who had reports including multiple "Severe" instances reflected in the report illustrated in FIG. 5 (or purple defects). These types of defects might have occurred because the representative chose not to follow a system prompt or chose not to provide scripting or other information that was prompted on the screen during a call with a customer. Management may use "Help me understand why" type of questions to address a behavior issue. In this type of situation, the employee presumably knew—the requirement is system generated—but the employee chose not execute properly.

Knowledge coaching may be used to remind a representative of something, e.g., "Please remember to ask/advise" information to customer. In a knowledge coaching scenario, the enterprise's requirement is not necessarily system generated. This, in turn, may imply that the there is a likelihood that the agent does not know how to perform according to enterprise standards or a company's policies, or has possibly forgotten the requirement.

In one embodiment, the system of the present invention is implemented as one or more software modules that enable a comprehensive Quality Management experience for all users within a Customer Care department. In one embodiment, a Quality Portal may be provided for access by system users and to allow a Quality team to manage its own consistency and performance in call evaluation. Supervisors may complete their own quality evaluations and augment Quality team evaluations as well as view Quality Reports for their agents, teams and departments. Process Coordinators may use the same tool to review data that can drive organizational improvement. Department leaders may also use the various tools and reports to monitor center-wide, team and individual performance as well as monitor process execution.

During the evaluation process, an employee of the Quality Team may come across a condition that causes a customer to have to call the utility back to resolve their initial inquiry (known as a "repeat call"), or the Quality employee may identify an area of improvement in the process. The Quality team will capture these observations, concerns or recommendations in an internal file that may be designated as the Operational Effectiveness Database. When an entry is made in this database, an automatically generated email is sent to the appropriate Process Coordinator for review. In addition, the Process Coordinator has the ability to review the Quality Data on their assigned segment call types from the Quality database that stores the data from each call evaluation.

Use of the present invention provides advantages that are internal to an enterprise as well as external. For example, use of the present invention assists process coordinators in development of their business cases (for example, identify process requirements in a Yellow Category and move into a Purple Category) with the goal of helping avoid representative errors. The system is also designed to improve performance by providing specific guidelines to employees while calls are being handled, thus resulting in avoidance of repeat calls.

FIG. 6 illustrates a user interface that may be used to evaluate a call. A process tab 601 visually identifies when a process is new. In one embodiment, the system of the present disclosure may identify when requirements have changed and may allow the user to bring up a process requirement sheet (FIG. 6-2) to view new (or all) requirements. For example, the report in FIG. 6-2 includes a number of questions 603 pertaining to the evaluation and also a corresponding coaching requirement 605 for each.

FIG. 7 highlights another aspect of the interface for users to evaluate a call. When evaluators run into a problem with releasing a call-hold evaluation to supervisors, the buttons 701 in the user interface provide functionality to assist the user in this type of situation. In one embodiment, all calls completed are released. For those who need to seek advice from a supervisor or a peer on criteria for scoring or evaluating calls, the evaluation could be completed but unreleased until advice has been provided.

The illustrated "Incomplete" button may be used to save a call and then return to it. This button may be used when the user needs a break, has to run into a meeting, etc.

Figure 8:
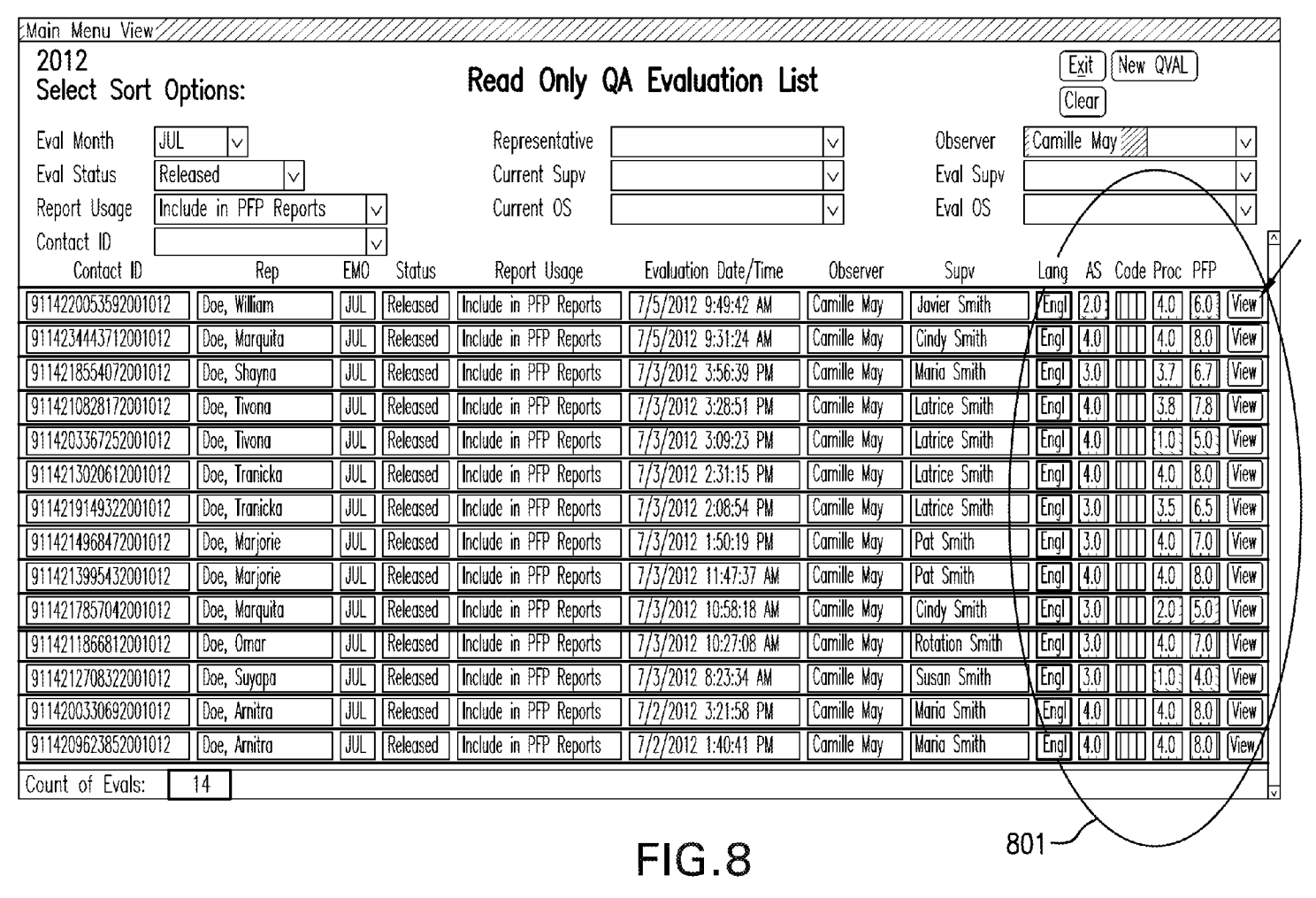

FIG. 8 illustrates a report that a user can use to sort evaluations, identify the number of evaluations completed, and identify the need for coaching based on the traffic light approach 801 described in the present disclosure.

FIG. 9 illustrates a user interface that guides the user to the evaluation score for a particular tab, identifies the defects for coaching, and provides a performance score used PFP reports, for example. Numeral 901 indicates that two tabs, code and process, do not require coaching, as the pattern used to fill in the blocks represents "green light" under the approach of the present disclosure.

Figure 10:
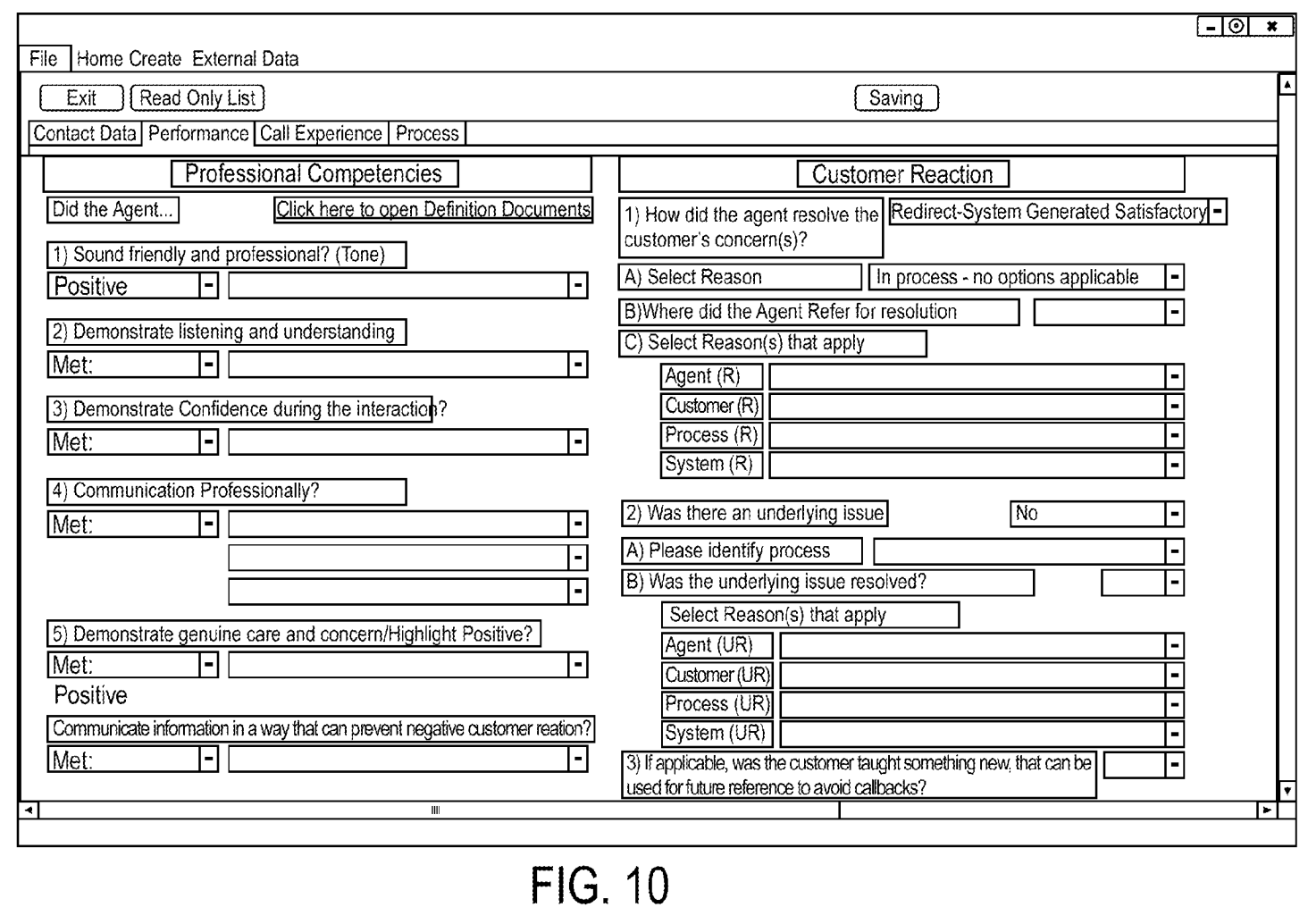

Turning now to FIG. 10, the drawing figure illustrates a user interface that may be used to track evaluation status and to enable a user to monitor, audit, modify, challenge, or otherwise to dispute an evaluation or its status. It will be appreciated that some embodiments may include a tracking tool configured and operative to determine and to track whether coaching were provided to a customer service agent with respect to any particular evaluation. In some instances, it may be desirable for a user interface such as that illustrated in FIG. 10 to display a status of a relevant evaluation (for example, whether the evaluation has been completed or is in an interim status such as "pending review," "audit occurred," and "other," or such other states that are necessary, desirable, or appropriate in accordance with system or corporate objectives); similarly, it may be desirable for such a user interface to enable a user or administrator to alter such a status vis-à-vis a particular evaluation.

In some instances, built-in or add-on functionality may enable a user, supervisor, reviewer, or some other authorized corporate representative to challenge each assessed factor on a Quality Assurance evaluation form (also referred to as a "QA form") that is used to evaluate a particular customer service agent's performance in handling a particular call or a series of calls. In that regard, the user interface depicted in FIG. 10 may provide a mechanism (such as a radio button, check box, drop-down menu, or other common user interface paradigm) that enables a supervisor or other authorized party to refute or otherwise to comment on a determination of performance (e.g., identified error, or a questionably successful call, for instance) identified on a QA form or other evaluation record that was originally completed and submitted by a member of the Quality Assurance team (or any other person or entity that completed a QA evaluation).

Specifically, in some implementations, a user interface such as the embodiment illustrated in FIG. 10 may enable certain designated or authorized individuals or team members charged with performing audits on completed QA forms to identify specific errors, or to correct erroneously identified mistakes, that were originally recorded during an evaluation that was completed by another member of the QA team or any other person responsible for completing a QA evaluation form (e.g., a supervisor, an instructor, a human resources or QA representative, etc.).

Given the description set forth above, it will be appreciated that the foregoing functionality may be built-in to a system and method of diagnosing and improving representative performance as set forth herein. In that regard, the term "built-in" may generally refer to functionality that is embedded within the QA form, though other implementations are contemplated. In the exemplary embodiment, as noted above, the foregoing functionality may be enabled or facilitated by a "check box," a "drop-down menu," or other common user interface construct that may be employed or displayed adjacent to or otherwise associated with each specific question or entry on the QA form. In this example, a user interface construct or selectable element may be selected by a user to indicate disagreement with or otherwise to amend, annotate, or comment on a particular entry associated with the user interface element. In the foregoing manner, the functionality depicted in FIG. 10 may provide a user-friendly method to request review of evaluation scores due to disagreement with any particular scored item or evaluated criterion on an applicable QA form.

In some embodiments, it may be desirable to include or to provide a response tracker for both the person challenging a disputed or contentious evaluation and the person who completed the original QA form. In such circumstances, a response tracker module and attendant user interface may display original scores, modified or amended scores, user input, comments, audit or review status, and ultimate outcome or resolution of the challenge related to a specific evaluation form; as noted above, this evaluation form may relate to a particular call or to overall performance over a series of calls or over a particular period of time. In that regard, it is contemplated that a user interface such as that illustrated in FIG. 10 may also include a composite report to display the status of multiple evaluations that have been challenged, disputed, or otherwise modified during the ordinary course of business.

The various embodiments and/or components, for example, the modules, elements, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description.

The foregoing description of possible implementations consistent with the present invention does not represent a comprehensive list of all such implementations or all variations of the implementations described. The description of only some implementation should not be construed as an intent to exclude other implementations. For example, artisans will understand how to implement the invention in many other ways, using equivalents and alternatives that do not depart from the scope of the invention. Moreover, unless indicated to the contrary in the preceding description, none of the components described in the implementations are essential to the invention.

The invention claimed is:

1. A computer-readable storage medium containing a data server application, which when executed on a processor is configured to perform an operation providing a view of performance data based on a plurality of performance rating criteria for evaluating at least one customer service agent in an enterprise, the operation comprising:
   receiving data corresponding to call handling performance;
   processing the received data to generate performance data related to a call type;
   assigning a color to selected performance data in accordance with an importance of a related process step; and
   displaying the performance data based on the color and indicative of omission of the related process step.

2. The computer-readable storage medium of claim 1, wherein said assigning a color comprises assigning a first color to the performance data in the event that the related process step is critical.

3. The computer-readable storage medium of claim 1, wherein said assigning a color comprises assigning a first color to the performance data in the event that the related process step is of an importance such that, if the related process step were not followed, may result in a severe consequence to an employee of the enterprise, a customer of the enterprise, or the enterprise.

4. The computer-readable storage medium of claim 1, wherein said assigning a color comprises assigning a first color to the performance data in the event that the related process step is of an importance such that, if the related process step were not followed, may indicate that a customer service agent requires coaching.

5. The computer-readable storage medium of claim 1, wherein the related process step comprises instructions to be followed when servicing a call type directed to a service disconnection or connection.

6. The computer-readable storage medium of claim 1, wherein said displaying comprises providing a display of a conduct code score, a culture code, a process code, or a PFP score.

7. The computer-readable storage medium of claim 2, wherein the related process step is characterized as critical based upon at least one of the following factors:
safety issue to an employee or a customer of the enterprise;
   financial risk to the enterprise;
   effect on a customer experience;
   effect on a cost of a call; or
   whether a call affects single contact resolution.

8. The computer-readable storage medium of claim 1, wherein said displaying comprises providing a display of coaching statements.

9. A computer-readable storage medium containing a data server application, which when executed on a processor is configured to perform an operation providing a view of performance data based on a plurality of performance rating criteria for evaluating a plurality of customer service agents across an enterprise, the operation comprising:
   receiving data corresponding to call handling performance;
   processing the received data to generate performance data related to a call type;
   assigning a color to selected ones of the performance data in accordance with an importance of a related process step; and
   displaying a user interface enabling modification of the performance data.

10. The computer-readable storage medium of claim 9, wherein said displaying a user interface comprises displaying a status of a particular evaluation for a particular customer service agent.

11. The computer-readable storage medium of claim 9, wherein said displaying a user interface comprises providing a user interface construct configured and operative to enable a challenge of an assessed factor related to the performance data.

12. The computer-readable storage medium of claim 9, wherein said displaying a user interface comprises providing a user interface construct selected from one of the following: a radio button; a check box; and a drop-down menu.

13. The computer-readable storage medium of claim 9, wherein said assigning a color comprises assigning a first color to the performance data in the event that the related process step is of an importance such that, if the related process step were not followed, may indicate that a customer service agent requires coaching.

14. The computer-readable storage medium of claim 9, wherein said displaying a user interface comprises providing a tracking tool configured and operative to determine whether coaching were provided to a particular customer service agent responsive to an evaluation.

15. The computer-readable storage medium of claim 9, wherein said displaying comprises providing a display of a conduct code score, a culture code, a process code, or a PFP score.

16. An enterprise call handling system comprising computer hardware and a computer-readable storage medium; said call handling system configured and operative to:
   receive data corresponding to call handling performance;
   process the received data to generate performance data related to a call type;
   assign a color to selected ones of the performance data in accordance with an importance of a related process step; and
   display a user interface enabling modification of the performance data.

17. The call handling system of claim 16, wherein the user interface comprises a user interface construct configured and operative to display a status of a particular evaluation for a particular customer service agent.

18. The call handling system of claim 16, wherein the user interface comprises a user interface construct configured and operative to enable a challenge of an assessed factor related to the performance data.

19. The call handling system of claim 16, further configured and operative to assign a first color to the performance data in the event that the related process step is of an importance such that, if the related process step were not followed, may indicate that a customer service agent requires coaching.

20. The call handling system of claim 19, wherein the user interface comprises a tracking tool configured and operative to determine whether coaching were provided to a particular customer service agent responsive to an evaluation.

* * * * *